United States Patent [19]
Matsudo et al.

[11] Patent Number: 5,347,506
[45] Date of Patent: Sep. 13, 1994

[54] OPTICAL DISK PLAYER INCLUDING A PLURALITY OF INDEPENDENT PICK-UPS

[75] Inventors: Yasunori Matsudo; Hisashi Naka, both of Kawasaki, Japan

[73] Assignee: Fujitsu Limited, Kawasaki, Japan

[21] Appl. No.: 968,529

[22] Filed: Oct. 29, 1992

[30] Foreign Application Priority Data

Nov. 1, 1991 [JP] Japan .................................. 3-286948

[51] Int. Cl.⁵ .............................................. G11B 7/00
[52] U.S. Cl. ...................................... 369/124; 369/50
[58] Field of Search ...................... 369/124, 50, 54, 58, 369/59, 94, 44.37, 95, 112, 13, 32

[56] References Cited

U.S. PATENT DOCUMENTS

| | | | |
|---|---|---|---|
| 3,829,610 | 8/1974 | Meeussen et al. | 369/94 |
| 3,946,367 | 3/1976 | Wohlmut et al. | 369/94 |
| 5,086,419 | 2/1992 | Yanagi | 369/44.28 |
| 5,161,142 | 11/1992 | Okano | 364/124 |

*Primary Examiner*—Paul M. Dzierzynski
*Assistant Examiner*—Kiet T. Nguyen
*Attorney, Agent, or Firm*—Armstrong, Westerman, Hattori, McLeland & Naughton

[57] ABSTRACT

An optical disk player for simultaneously reading data recorded on different areas of the optical disk is disclosed. The optical disk player provides a plurality of pairs of optical pick-ups and pick-up positioning mechanisms. A rotational speed of the optical disk is controlled according to a synchronization signal obtained from a first pick-up and the first pick-up can read the recorded data by a normal method, however, other pick-ups need to change read rates according to respective linear velocity. Therefore, reading speed changing circuits are provided for each of the optical pick-ups except a first pick-up and they change read rates according to linear velocities of the optical disk at reading positions.

4 Claims, 3 Drawing Sheets

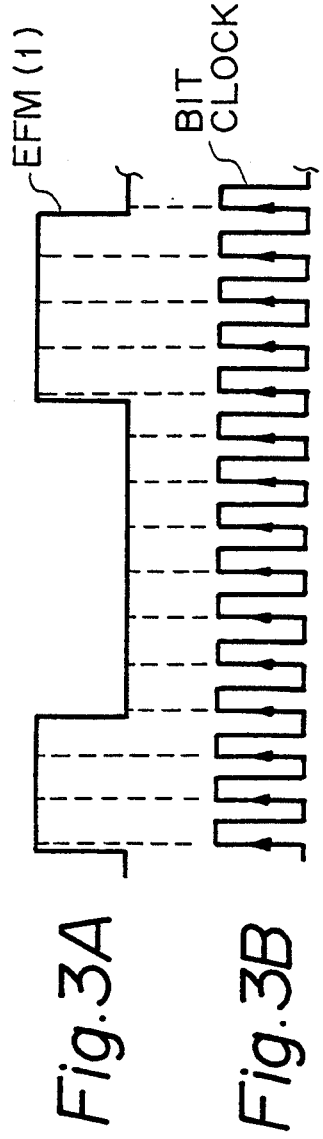
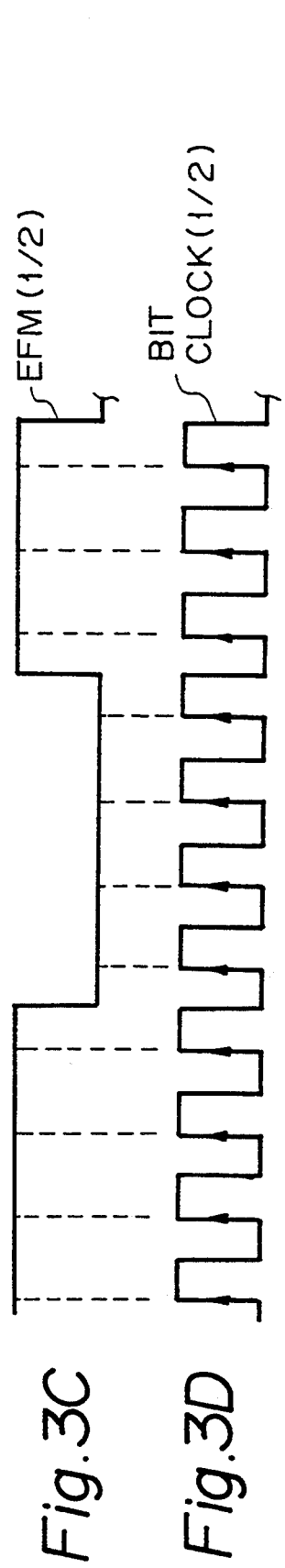
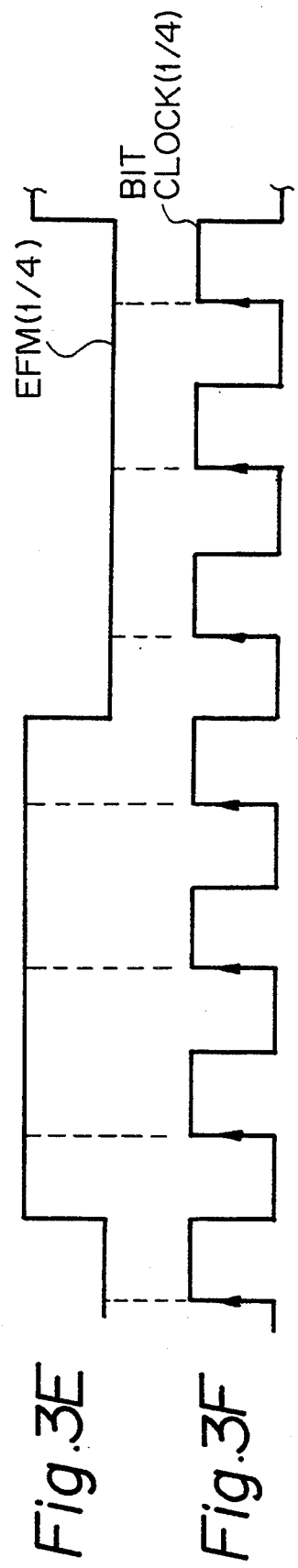
Fig.3A Fig.3B Fig.3C Fig.3D Fig.3E Fig.3F

OPTICAL DISK PLAYER INCLUDING A PLURALITY OF INDEPENDENT PICK-UPS

BACKGROUND OF THE INVENTION

1. Field of the Invention

The present invention relates to an optical disk player for simultaneously reading data recorded on different areas of the optical disk. Particularly, it relates to a compact disk player (CD-player) for simultaneously reading both data of a sound signal recorded on a first recording area and other digital information such as computer programs recorded on other areas of a CD-ROM disk or a CD-I disk.

2. Prior Art

Optical disk systems are widely used in many fields. Particularly, many new CD systems such as a CD-ROM system, a CD-I (CD interactive) system and so forth are used as a storage device in a computer system. In a multimedia computer system, different kinds of digital information such as character data, image data, graphic data, program data, etc., are recorded on the CD disk together with sound data. These different data are recorded in respective areas of the CD disk. In these CD systems, a conventional CD player for music use can be commonly used.

There exist two types of disk rotation methods of the optical disk system, i.e., a Constant Angular Velocity (CAV) and a Constant Linear Velocity (CLV). In the CAV method, the optical disk is rotated at a constant speed, therefore, the recording density is higher in an inner area than in an outer area in order to obtain a constant read rate. In the CLV method, the recording density is constant in all recording areas, therefore, the rotational speed of the disk motor is controlled so as to obtain a constant linear velocity regardless of a reading position, that is, the rotational speed when an inner area is being read is higher than that when an outer area is being read. The CLV method has an advantage in that more information can be recorded on a disk, but has a disadvantage in that the control operation of a disk motor becomes complex and, in a video reproducing system, a static image cannot be obtained only by a mechanical means. The CD player adopts the CLV method.

In an optical player adopting the CLV method, the rotational speed of a disk motor is controlled by a synchronization signal included in recorded data. This recorded data is read by an optical pick-up and the synchronization signal is extracted from the read signal. The accuracy of the linear velocity is required to be within 1.2 to 1.4 m/s.

In optical players, including the CD player, only one optical pick-up is provided and it is moved according to read positions. Consequently, when reading data recorded in different areas of an optical disk such as a CD-ROM disk and a CD-I disk, these data are sequentially read by moving the optical pick-up to the corresponding reading positions. However, in the multimedia system utilizing the CD-ROM system or the CD-I system, it occurs that different data are desired to be read simultaneously. For example, an amusement game system is desired in which the reproduction of high quality music sound can be continued without an interruption while other data such as character data, graphic data, image data and program data relating to this music sound data are read from the optical disk. However, in an amusement game system including a conventional CD player, the music sound is interrupted because only one pick-up reads data sequentially.

Further, a CD-ROM system used as a storage apparatus of a computer system generally has a disadvantage in that its access speed and its read rate are inadequate. Particularly, when data recorded in different areas of a CD-ROM disk are read, a total time for completing the reading operations becomes very long.

SUMMARY OF THE INVENTION

The object of the present invention is to realize an optical disk player for simultaneously reading a plurality of data respectively recorded on different areas of the optical disk.

According to the present invention, an optical disk player provides a plurality of optical pick-ups for reading the data, a plurality of pick-up positioning mechanisms each of which is respectively provided for each of the optical pick-ups and independently move the corresponding pick-ups, and reading speed changing circuits each of which is respectively provided for each of the optical pick-ups except a first pick-up and respectively changes a read rate of the pick-up according to a linear velocity of the optical disk at each reading position.

BRIEF DESCRIPTION OF THE DRAWINGS

The present invention will be more clearly understood from the description as set forth below with reference to the accompanying drawings, wherein:

FIGS. 3A through 3F are time charts illustrating three kinds of read signals and read timing clocks corresponding to three different reading positions;

DESCRIPTION OF THE PREFERRED EMBODIMENTS

The present invention can be applied to all kinds of optical disk systems. However, many applications are now proposed for a CD system, therefore, an embodiment in which the present invention is applied to a CD player is described. However, the present invention is not limited to a CD player.

Figure 1:
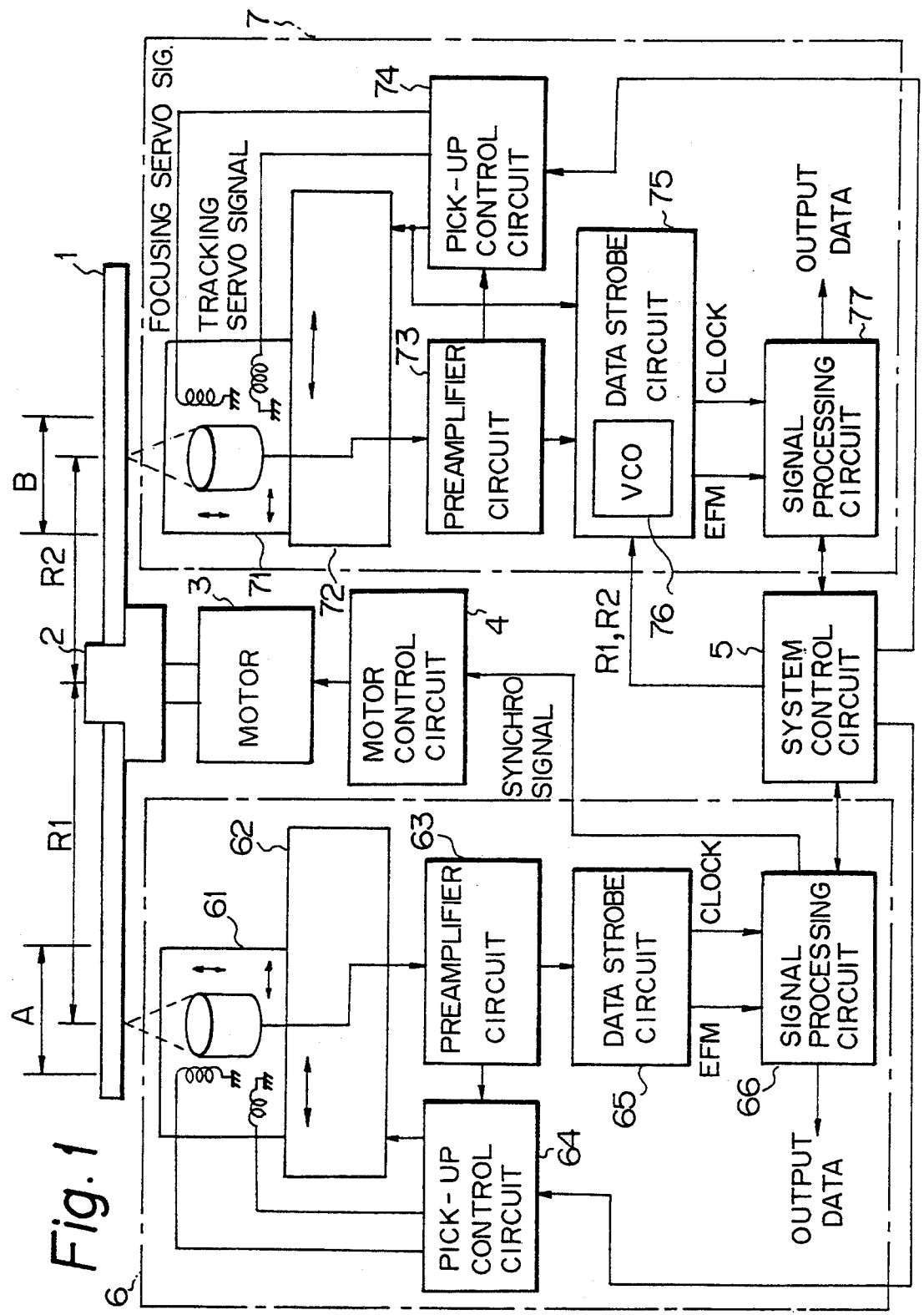
FIG. 1 is a circuit block diagram illustrating an embodiment of the CD player according to the present invention.

FIG. 1 is a circuit block diagram illustrating a CD player of the embodiment according to the present invention.

In FIG. 1, reference number 1 designates a Compact Disk (CD) which has two recording areas. One recording area is an outer area A in which sound data are recorded, and the other recording area is an inner area B in which other digital data such as character data, graphic data, image data and program data are recorded. Reference number 2 designates a flange to which the CD is fixed. Reference number 3 designates a disk motor which rotates the flange 2, that is, the CD 1. The rotational speed of the motor 3 is controlled by a motor control circuit 4 which usually includes a Phase Locked Loop (PLL) circuit. Reference number 5 designates a system control circuit which totally controls each portion of the apparatus.

Reference number 6 designates a portion which includes a pick-up 61, a pick-up feed mechanism 62, a preamplifier 63, a pick-up control circuit 64, a data strobe circuit 65 and a signal processing circuit 67. The pick-up 61 includes a laser diode, a focusing lens system, a photo sensor, a focus servo mechanism and a tracking servo mechanism. The pick-up 61 detects pits corresponding to the recorded data on the CD and outputs a read signal therefrom. These recorded data are modulated according to an Eight to Fourteen Modulation (EFM) method. Therefore, the read signal is called an EFM signal. The pick-up feed mechanism 62 moves the pick-up 61 to the read position. The preamplifier circuit 63 amplifies the read signal output from the pick-up 61 and shapes the waveform of the read signal. The pick-up control circuit 64 extracts pick-up servo signals from the read signal output from the preamplifier 63. The data strobe circuit 65 identifies differences of pulse widths of the read signal and generates a bit clock for reading the read data. Details of this data strobe circuit 65 are explained later. In the signal processing circuit 67, the read data, that is, the EFM signal is reproduced to derive a digital signal directly corresponding to the original data, and a synchronization signal is extracted from the EFM signal. The motor control circuit 4 receives the synchronization signal from the data strobe circuit 65 and controls the rotational speed according to the synchronization signal. In this way, a constant linear velocity is realized at the reading position. The linear velocity is required to be within 1.2 to 1.4 m/s. In a CD player for music use, this digital data is converted to analog data and output from a speaker. All portions described above are the same as those of a conventional CD player and many kinds of Integrated Circuits (ICs) are available for the above circuit portions.

As shown in FIG. 1, the CD player of this embodiment further provides a portion 7 which is similar to the portion 6. In this embodiment, the portion 6 is called a first portion and the portion 7 is called a second portion, and the pick-up 61 is called a first pick-up and a pick-up 71 is called a second pick-up. The first pick-up 61 is used for reading the sound data recorded in the area A and the second pick-up 71 is used for reading other digital data recorded in the area B. Constructions of the portion 7 are almost the same as those of the portion 6 except that a data strobe circuit 75 provides a VCO circuit 76 for changing the read rate according to read positions.

The motor control circuit 4 controls the rotational speed of the CD only according to the synchronization signal output from the signal processing circuit 66 of the portion 6. Therefore, the linear velocity of the CD is held to a normal value at the reading position of the first pick-up 61 and the sound data recorded in the area A is reproduced at a normal read rate. However, the linear velocity of the CD at the reading position of the second pick-up is different from the normal value. When radii from the rotational center to the reading position of the first pick-up 61 and the reading position of the second pick-up 71 are respectively R1 and R2, the linear velocity V2 at the reading position of the second pick-up 71 is expressed by the following formula;

$$V2 = V1 * R2/R1$$

wherein V1 is a linear velocity at the reading position of the first pick-up 61.

Since the area A is the outer portion of the CD and the area B is the inner portion of the CD, the linear velocity at the reading position of the second pick-up is slower than that of the first pick-up. Therefore, the read rate of the signal output from the second pick-up 71 is required to be reduced according to the above formula.

The read rate is determined by a bit clock signal generated at the data strobe circuit 75. In the following, constructions and operations of the data strobe circuit 75 are explained.

Figure 2:
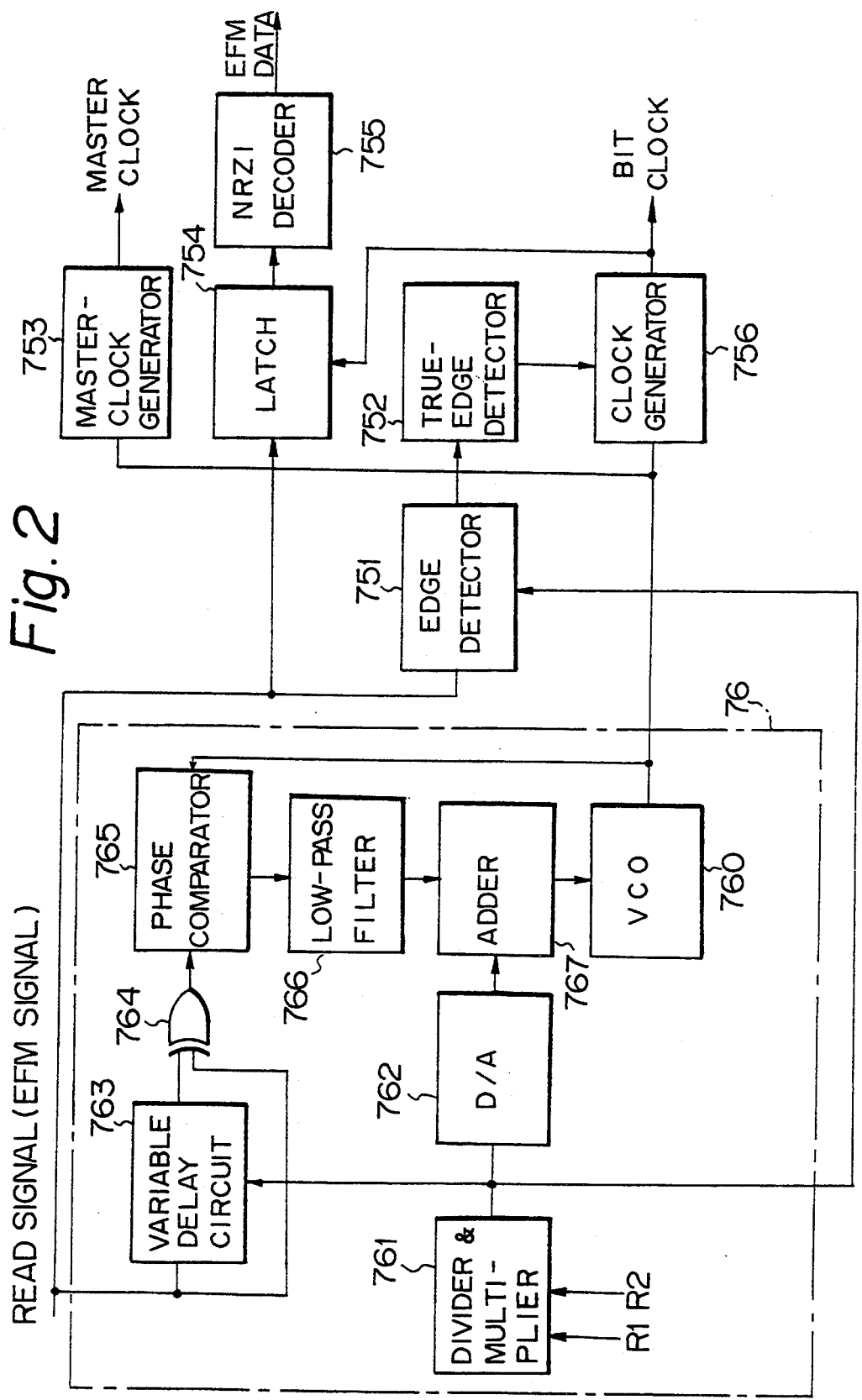
FIG. 2 is a detailed block diagram illustrating a data strobe circuit shown in FIG. 1.

FIG. 2 is a block diagram illustrating the construction of the data strobe circuit 75. As shown in FIG. 2, the data strobe circuit 75 includes an edge detector 751, a true edge detector 752, a master-clock generator 753, a latch 754, an NRZI decoder 755, a clock generator 756 and an oscillator portion 76 including a Voltage Control Oscillator (VCO) 760. The portions except for the oscillator portion 76 are almost the same as those of the conventional data strobe circuit. However, the edge detector 751 is required to be changeable according to the read rate. This is explained later. The conventional data strobe circuit includes a crystal oscillator generating 34.57 MHz in place of the oscillator portion 76. The frequency 34.57 MHz is eight times a fundamental frequency of the EFM signal. When the linear velocity is correct, the EFM signal provides the fundamental frequency. In operation of the conventional CD player, at first, the rotational speed of the CD is set at a value predicted to be proper from the reading position. When the linear velocity is within 1.2 to 1.4 m/s, the synchronization signal can be obtained. Then, the control of the CD rotation is changed from the preset value to this synchronization signal, and the rotational speed of the CD is adjusted so that the synchronization signal corresponds to the predetermined value. The generation of a bit clock signal and the extraction of the synchronization signal from the EFM signal are performed according to the clock signal generated by the crystal oscillator, that is, the oscillator portion 76. Therefore, the read rate is changed by changing the frequency of the oscillator portion 76.

As shown in FIG. 2, the oscillator portion 76 includes a VCO 760, a divider & multiplier circuit 761, a digital-to-analog (D/A) converter 762, a variable delay circuit 763, an Exclusive OR gate 764, a phase comparator 765, a low-pass filter 766 and an adder 767. The divider & multiplier circuit 761 receives a radius R1 showing the reading position of the first pick-up 61 and a radius R2 showing the reading position of the second pick-up 71, and calculates a ratio of the two radii. The practical reading positions of the first and second pick-ups 61 and 71 are detected by the pick-up feeding mechanisms 62 and 72, therefore, the radii R1 and R2 can be received from these portions. In practice, this information is transmitted to the system control circuit 5 of FIG. 1, therefore, the divider & multiplier circuit 761 receives the two radii R1 and R2 from the system control circuit 5. This ratio of the two radii corresponds to a ratio of the read rate of the second pick-up to the normal read rate. The divider & multiplier circuit 761 further calculates the value applied to the VCO via the D/A converter 762 by multiplying by a predetermined value. This value is converted to an analog value by the D/A converter 762 and input to the adder 767. When the reading operation of the second pick-up 71 starts, the read signal (EFM signal) is not synchronous with the clock signal output from the VCO 760. Therefore, no DC current is output from the low-pass filter 766, and the frequency of the VCO 760 is determined only by this value.

The variable delay circuit 763 delays the EFM signal and the EXOR gate 764 detects changing edges of the EFM signal. For correctly detecting the edges of the EFM signal, the delay time of the delay circuit 763 must be changed according to the fundamental frequency of the EFM signal. Therefore, the delay time of the variable delay circuit 763 can be changed according to an output of the divider & multiplier circuit 761. The variable delay circuit is realized by delay lines having many different delay times and a selector for selecting the delay time. The edge detector 751 also has a circuit composed of the variable delay circuit 763 and the EXOR gate 764. The output of the edge detector 751 can be replaced with the output of the EXOR gate 764, and the edge detector can be omitted.

The variable delay circuit 763, the EXOR gate 764, the phase comparator 765, the low-pass filter 766, the adder 767 and the VCO 760 form a Phase Locked Loop (PLL) circuit. When the fundamental frequency of the EFM signal becomes near to the frequency of the VCO 760, this PLL circuit operates so as to make the clock signal agree with the fundamental clock signal of the EFM signal. When the clock signal output from the VCO 760 agrees with the fundamental clock signal of the EFM signal, a bit clock output from the clock generator 756 becomes usable, and the EFM data is correctly decoded and the correct synchronization signal can be obtained. In this way, the data recorded in the area B can be independently read by the second pick-up when the sound data recorded in the area A is read by the first pick-up.

FIGS. 3A through 3F are timing charts illustrating three kinds of pairs of EFM signals and bit clock signals of the embodiment. FIGS. 3A and 3B respectively show an EFM signal and a bit clock signal of the first pick-up. The frequency of the bit clock signal is 4.32 MHz. FIGS. 3C and 3D respectively show an EFM signal and a bit clock signal of the second pick-up when it locates at the position whose radius from the rotation center is half of the radius of the reading position of the first pick-up. FIGS. 3E and 3F respectively show an EFM signal and a bit clock signal of the second pick-up when it locates at the position whose radius from the rotation center is a quarter of the radius of the reading position of the first pick-up. It is apparent that both cycle times of the EFM signal and the bit clock signal change in proportion to the ratio of the two radii. Therefore, each EFM data is correctly read by the bit clock.

If the sound data are reproduced at an abnormal read rate, correct sound cannot be obtained. Therefore, in this embodiment, the first pick-up reads the sound data and the rotation of the CD is controlled by the synchronization signal obtained from the read signal of the first pick-up. In this way, the correct sound is reproduced. Other digital data are not read at the normal speed, however, since this digital data does not need to be reproduced at normal speed because the digital data such as character data, graphic data, etc., are not influenced by the reproduction speed.

In above embodiment, two pick-ups are provided, however, more pick-ups may be provided. When more pick-ups are provided, each additional pick-up includes the same circuit portion 7 of FIG. 1. When more pick-ups are provided, more data can be read simultaneously.

Further, if a CD having no sound data is read, the correspondence between pick-ups and kinds of data is not restricted.

Many widely different embodiments of the present invention may be constructed without departing from the spirit and scope of the present invention, and it should be understood that the present invention is not limited to the specific embodiment described in this specification, except as described in the appended claims.

We claim:

1. An optical disk player for simultaneously reading a plurality of data respectively recorded on a plurality of recording areas of an optical disk, comprising:
   a plurality of optical pick-ups for reading said data; said plurality of optical pick-ups including a first optical pick-up and at least one other optical pick-up;
   a plurality of pick-up positioning mechanisms which are respectively provided for each of said plurality of optical pick-ups, and independently move corresponding ones of said plurality of optical pick-ups;
   reading speed changing means which are respectively provided for each of said at least one other optical pick-up, and which change read rates of said at one other optical pick-up according to linear velocities of said optical disk at reading positions of said at least one other optical pick-up.

2. An optical disk player for simultaneously reading a plurality of data respectively recorded n a plurality of recording areas of an optical disk, comprising:
   a plurality of optical pick-ups for reading said data; said plruality of optical pick-ups including a first optical pick-up and at least one other optical pick-up;
   a plurality of pick-up positioning mechanisms which are respectively provided for each of said plruality of optical pick-ups, and independently move corresponding ones of said plurality of optical pick-ups;
   reading speed changing means which are respectively provided for each of said at least one other optical pick-up, and which change read rates of said at least one other optical pick-up according to linear velocities of said optical disk at reading positions of said at least one other optical pick-ups; and
   a rotation control means for controlling a rotational speed of said optical disk so that said read rate of said first optical pick-up is constant.

3. An optical disk player as set forth in claim 2, wherein said first optical pick-up is used for reading sound signal data.

4. An optical disk player as set forth in claim 2, wherein each of said reading speed changing means provides calculation means for calculating a ratio of radii of its own reading position and a reading position of said first optical pick-up, and said reading speed changing means changes said read rate according to said ratio of radii.

* * * * *